Sept. 3, 1968
M. A. HOWE, JR
3,399,506
PROCESS AND APPARATUS FOR SIMULTANEOUSLY HEAT
SEALING AND HEAT SHRINKING FILM
Filed April 1, 1965
2 Sheets-Sheet 1
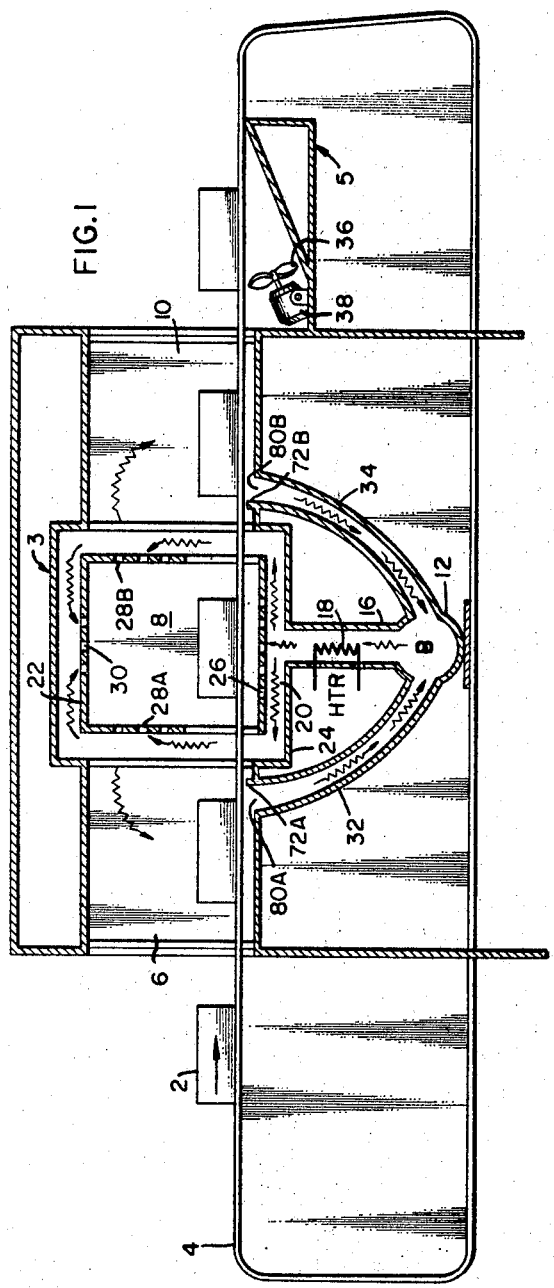
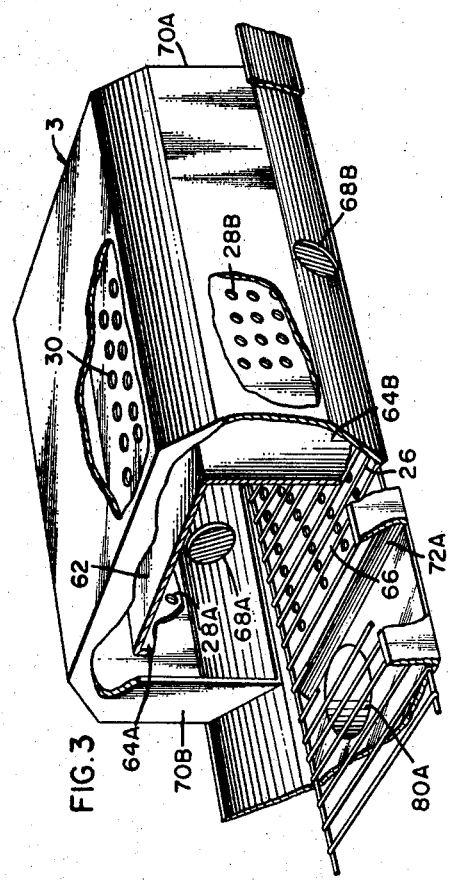

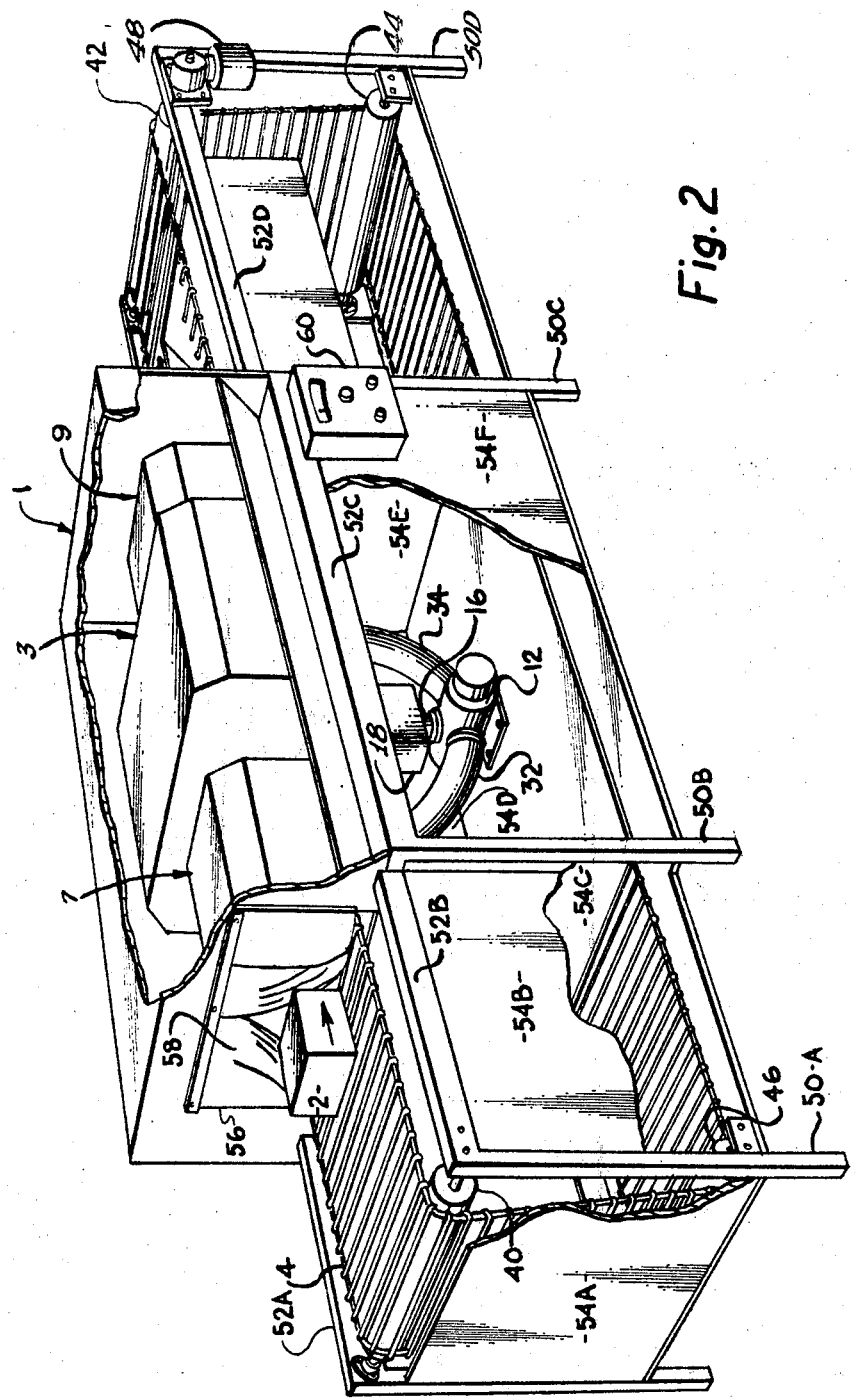

3,399,506
PROCESS AND APPARATUS FOR SIMULTANEOUSLY HEAT SEALING AND HEAT SHRINKING FILM

Milton A. Howe, Jr., Bedford, Mass., assignor to W. R. Grace & Co., Duncan, S.C., a corporation of Connecticut
Filed Apr. 1, 1965, Ser. No. 444,695
8 Claims. (Cl. 53—39)

ABSTRACT OF THE DISCLOSURE

A process and apparatus for simultaneously heat sealing and heat shrinking film overwrapped about an object. The heated air discharged into a heating zone of the apparatus is permitted to overflow into adjacent preheating and post-heating zones from which the air is salvaged prior to reheating and being reintroduced into the heating zone.

---

This invention relates to the heat sealing of film overwrapped about an object. In one aspect, the invention relates to the heat shrinking of film overwrapped about an object.

It is well known to employ various flexible, heat shrinkable sheet materials in the packaging of products, including food products. These heat shrinkable materials provide an inexpensive, substantially air-tight package which will prevent contamination of the product when properly heat sealed and which will maintain perishable items in a state of freshness for a relatively long period of time. In addition, these films enhance the appearance of the product and conform to the contours of the object due to their transparency and shrinking characteristic respectively.

A number of devices (so-called "heat shrinking tunnels") have been proposed for heat shrinking the film about the object. In addition, a number of devices have been proposed for heat sealing the overlapped film prior to the heat shrinking operation. Although these devices generally perform their individual function satisfactorily, it is necessary to employ two devices and to use two separate process step to heat seal and then heat shrink the film.

It is an object of the invention to provide process steps and apparatus elements for heat sealing film overwrapped about an object.

Another object is to provide process steps and apparatus elements for heat shrinking film overwrapped about an object.

Still another object of the invention is to provide simultaneous heat sealing and heat shrinking of film overwrapped about an object.

Yet another object of the invention is to improve the efficiency of heat sealing and heat shrinking processes and apparatus.

These and other objects of the invention will be readily apparent to those skilled in the art from the accompanying disclosure, drawing, and appended claims.

These objects are broadly accomplished by passing the overwrapped film on a conveyor through a heating zone, heating air to heat sealing temperature, impinging a portion of said heated air against the overlapped film to heat seal the package while the remainder of this heated air is diverted and introduced into the heating zone on the remaining sides of the package at heat-shrinking temperatures, said heat sealing and heat shrinking taking place simultaneously.

In one embodiment the air discharged into the heating zone is permitted to overflow into adjacent preheating and post-heating zones from which said air is salvaged prior to reheating and being reintroduced into said heating zone.

Preferably, the heating tunnel of this invention employs a dual-walled heating chamber having interior and exterior walls forming an annulus therebetween. The interior walls have apertures in the top, bottom, and side portions. A portion of the air, heated to heat-sealing temperatures, is introduced into said annulus, between the interior and exterior walls, directly opposite the apertures adjacent the overlapped film on the package being conveyed through the tunnel so as to heat seal the overwrapped film. Preferably, the overlap is on the bottom of the package, resting on the conveyor. Only a portion of the heated air is passed through the aforesaid heat sealing apertures with the remainder of the air passing around and through the annulus and being discharged through the remaining apertures into interior walls of the heating tunnel.

The invention is not to be limited to any particular type, shape, or size of product or to any particular type of heat-shrinkable film. Any of the well-known heat-shrinkable thermoplastic films may be employed, such as the oriented polyolefins (including, but not limited to polyethylene, polypropylene, polybutene-1), the polyvinyls, the polyesters, vinylidene chloride polymers (such as Saran), polyamides (such as nylon), polystyrene and the like. The particular temperatures employed will vary therewith. The term "polymer" as employed herein includes homopolymers, copolymers, terpolymers, block copolymers, random copolymers, graft polymers and the like. The films may also be laminates of different films. The films must be heat shrinkable and are thus molecularly oriented, either mono or preferably biaxially oriented. The films, e.g., polyethylene, may be irradiated such as described in patents to Baird, U.S. 3,022,543, and Rainer et al., U.S. 2,877,500, incorporated herein by reference. Preferably the film is 0.1 to 20 mils thick.

The invention is broadly applicable to any type of product including non-foods such as toys, books, clothing, overwrap on cartons, and the like, and foods such as bananas, other fruits, vegetables, poultry, poultry and turkey by-products, and meat products and the like either with or without a tray or other carrying means. The efficiency of the forcibly impinging hot air and the very short period of exposure to elevated temperatures makes the device particularly suitable for products easily damaged by heat, e.g., a bunch of bananas. Particularly preferred product is whole or cut-up chicken or other poultry either with or without a tray, such as a pulp tray.

The temperature of the air in the heating tunnel, preheating tunnel or postheating tunnel will depend on such factors as the product, size of product, temperature of product, type and thickness of film employed and the type of overlap employed and the like. In any case, the air will be heated above the heat sealing temperature of the film, for example, an air temperature of 340°–565° F. is preferred for heat sealing Cryovac L film, an irradiated polyethylene which has been biaxially oriented.

By introducing the heated air directly opposite the apertures below the overlapped film, the air is employed for heat sealing before it cools below heat sealing temperatures. Preferably, the air is introduced at a distance of 2–3 inches below the apertures. The remainder of the air cools slightly during passage through the annulus but is still above the temperature necessary for heat shrinking. For example, for irradiated polyethylene, the air temperature in the heat sealing-shrinking area is preferably about 350° to 450° F., about 450° to 565° F. in the preheating area and about 340° to 450° F. in the postheating area. Maximum temperatures are dependent on total exposure time.

It is particularly important that the air be forcibly impinged onto the film, especially on the overlapped film area. For example, the air is preferably introduced through the heat sealing orifices at 1000 to 10,000 ft./min., preferably 2000 to 6000 ft./min., while the air through the heat shrinking apertures may be in the same range of velocity or somewhat less, for example 3500 ft./min. for heat shrinking when using 5000 ft./min. for heat sealing. The size of the orifice may be adjusted in size to provide these velocities. Suitable aperture size is 1/8–3/8 inch in diameter. Suitable means, such as plugs, may be employed to permit variation in the number of apertures open to passage of air depending on the size or shape of the product.

It is also important that the air not be static in any of the areas in the tunnel, especially the heat sealing-shrinking tunnel.

The method of wrapping the film about the product is well within the skill of the art. A particularly suitable method of wrapping whole chickens is to place the overlapper portion on the back side of the whole chicken with the overlap then resting on the conveyor.

FIGURE 1 is a simplified flow diagram illustrating schematically the flow pattern of air and product.

FIGURE 2 is an overall perspective of the preheating tunnel, sealing-shrinking heat tunnel or chamber, postheating tunnel, cooling device, and conveying means.

FIGURE 3 is a detail view of the heating tunnel (heat sealing-shrinking) with portions cut away to illustrate the ports and apertures for introducing and recovering air.

The invention is best described with reference to the drawing.

As illustrated in FIGURE 1, the product 2 is conveyed serially through the heating zones 7, 3 and 9 by any suitable conveying means, such as a foraminous, reticulated or wire conveyor, through which air can readily pass. For example, the product 2 is placed by an operator (not shown) onto the endless conveyor belt 4 and passed first through a preheating zone 6, then through a heating zone 8 and then through a postheating zone 10. Air is forced by blower 12 upward through passageway or conduit 16 and past heater 18 into a passageway or annulus 20. The annulus 20 is formed by an interior wall 22 and an exterior wall 24 so as to provide a free flow of air therethrough. The interior wall is provided with apertures 26, 28A, 28B and 30 in the bottom, sides and top portions respectively. For simplicity, the apertures in the side wall are shown in this view so as to schematically illustrate flow pattern (although in a true longitudinal cross-section, apertures 28A and 28B would not show).

Thus, the hot air passes through conduit 16 and by heater 18 with a portion of said heated air passing directly through apertures 26 in the lower wall. This portion of heated air, which is at heat-sealing temperatures, passes through conveyor 4 and forcibly impinges on the lower surface of the package 2 so as to heat seal the overlapped film on this surface. The remainder of the air from conduit 16 passes in either direction through annulus 20 discharging through apertures 28A, 28B and 30 into the interior of the heat sealing-shrinking tunnel 3. The air within tunnel 3 is permitted to overflow into adjacent heating zones 6 and 10 so as to both preheat and postheat the package. The air is withdrawn or recovered from zone 6 or 10 through discharge ports 80A and 80B into conduits 32 and 34 and passed back to blower 12 to be reintroduced into the tunnels. Thus, the air first introduced through apertures 26 heat seals the overlapped film; the air introduced through apertures 28A, 28B and 30 heat shrinks the film; while the air in zones 6 and 10 are more efficiently employed to preheat and postheat the package to insure a wrinkle-free package. For example, the preheated air starts the shrink, especially at protruding points while the postheating air removes any wrinkles not removed in zone 3. The heated package is then removed from the heating zones by the conveyor 4 and is immediately cooled by a cooling means 5 to solidify the molten polymer in the heat seal. This cooling means may be any suitable device such as a simple fan blade 36 connected to a motor 38 so as to direct air onto the underside of the package. The package is then removed from the conveyor by an operator or any other suitable means.

In FIGURE 2 the entire apparatus is shown in perspective with certain exterior walls being cut away to expose the interior of the chamber. The package 2 is placed on the conveyor 4, which is illustrated as a wire-type endless conveyor, passing over rollers 40, 42, 44 and 46 appropriately journalled and driven by any suitable means such as motor 48. The entire device may be supported by any suitable framework, such as by legs 50A, 50B, 50C, 50D and other framework 52A, 52B, 52C, 52D. Walls 54A, 54B, 54C, 54D, 54E, 54F may be provided where necessary for protection of the operator or equipment. The package 2 is introduced into the heating zone 1 through an opening 56 partially covered by a heat resistant drape or curtain material 58. Both ends of the heating zone 1 are thus protected so as to reduce heat losses. The package first passes into preheating tunnel 3, then into postheating tunnel 9 and then over the cooling zone 5. Any suitable control device, temperature measuring means and the like may be employed, as generally designated by control panel 60. The passage of air is as described with reference to FIGURE 1.

A detail view of heating tunnel 3 is provided in FIGURE 3 illustrating the positions of the inlet apertures 26, 28A, 28B and 30 in relation to the top wall 62, side walls 64A and 64B and the bottom wall 66. It is convenient to discharge the air into the annulus 20 from the inlet conduit 16 up toward the side and top walls by means of inlet ports 68A and 68B. The lower portion of the outer walls 70A and 70B may be at an angle to the horizontal if desired. The discharge ports, as represented by opening 80A, are positioned in the lower portion of the preheating and postheating tunnels. It is most important that these ports be located so as to require all the air from the heating tunnel to flow rapidly over the product before being discharged. By placing the ports below the conveyor, all of the air being discharged rushes by, over and around the package as it passes on the conveyor through the tunnel. This greatly increases the efficiency of the tunnels and makes it possible to obtain higher air velocities in contact with the package instead of increasing the air temperature. The discharge ports 80A, 80B may be located in the middle or either end portion of the preheating and postheating tunnels 3, 7. Preferably, the ports are in the intermediate portion of the tunnel. Air flow dams 72A and 72B are provided below the conveyor between the discharge ports and the heating tunnel 3 to insure that there is not a direct passageway below the conveyor for the air from the tunnel 3 to the ports 80A and 80B so as to insure distribution of the air in the preheating and postheating zones.

While certain examples, compositions, process steps, and apparatus elements have been described for purposes of illustration, the invention is not to be so limited. Variation within the scope of the disclosure, drawing, and the claims can readily be effected by those skilled in the art.

I claim:

1. A process for simultaneously heat sealing and heat shrinking a biaxially oriented polymeric film wrapped about a product comprising (a) encasing a product in said film and overlapping the film edges to form a package, (b) progressively conveying said package through a preheating zone, heat sealing-shrinking zone and postheating zone, substantially all portions of said package being exposed to heat therein, (c) introducing streams of hot air into said heat sealing-shrinking zone so as to forcibly impinge simultaneously on substantially all portions of said package, (d) said hot air overflowing into said preheating and postheating zones, (e) salvaging said hot air from said preheating and postheating zones, (f) reheating said salvaged air outside said zones to a temperature above the heat sealing temperature of said film, (g) progressively introducing said reheated air into said heat sealing-shrinking zone by first forcibly impinging a portion of said reheated air onto the overlapped film edges and then forcibly impinging the remainder of said reheated air, which is cooled slightly but is still above the heat shrinking temperature of said film, onto the top and side portions of said package.

2. Apparatus for heat sealing and heat shrinking film wrapped about a product comprising, in combination:
    (a) an open-ended heating tunnel having 2 side walls, a bottom wall and top wall,
    (b) a plurality of apertures in said walls,
    (c) a conveying means adapted to convey the wrapped product through said tunnel over the apertures in said bottom wall and adapted to permit the passage of air therethrough to directly contact the bottom portion of the wrapped product,
    (d) a housing having 2 side walls, a bottom wall and top wall spaced apart and completely enclosing said tunnel, except for the open ends, thus providing an annulus for the free flow of air therethrough,
    (e) an inlet aperture in the bottom wall of said housing,
    (f) an inlet conduit in communication with said inlet aperture,
    (g) means for forcing air into said inlet conduit,
    (h) means for heating said air above heat sealing temperatures,
    (i) said heated air passing upwardly through said inlet conduit into said annulus, a portion of said air passing through the aperture in the bottom wall and the remainder of the air diverted through the annulus to discharge through the apertures in the side and top walls,
    (j) and means for recovering the discharged air positioned exteriorly of the open end of said heating tunnel and in communication with said means for forcing air into said inlet conduit.

3. Apparatus for heat sealing and heat shrinking film wrapped about a product comprising, in combination:
    (a) a preheating tunnel,
    (b) a heat sealing-shrinking chamber,
    (c) a postheating tunnel,
    (d) said preheating tunnel, heat-sealing chamber, and postheating tunnel being interconnected in series, each being open at either end thus forming an open path for
    (e) a reticulated conveying means for conveying product through said preheating tunnel, heat-sealing chamber, and postheating tunnel in series,
    (f) said chamber being enclosed, except for the open ends, in a housing spaced apart therefrom to form an annulus for the passage of said around said chamber,
    (g) top, bottom and side walls for both said chamber and said housing,
    (h) a multiplicity of apertures in the walls of said chamber,
    (i) an inlet aperture in the bottom wall of said housing opposite the apertures in the bottom wall of said chamber,
    (j) outlet apertures in said preheating and postheating tunnels,
    (k) a blowing means having an inlet and outlet port,
    (l) a first and second outlet conduit in communication with said outlet apertures and said inlet port,
    (m) an inlet conduit interconnecting said outlet port and said inlet aperture, and
    (n) heating means disposed in said inlet conduit adapted to heat air to heat sealing temperatures.

4. The apparatus of claim 3 wherein the apertures in the bottom wall of said chamber are in the central portion thereof directly below the conveying means.

5. The apparatus of claim 3 wherein baffles are positioned under the conveying means in the preheating and postheating tunnels between the outlet apertures and said chamber.

6. The apparatus of claim 3 wherein means are provided for adjusting the number of apertures available for the discharge of air therethrough.

7. The apparatus of claim 3 wherein a cooling means is positioned immediately downstream of said postheating means to cool the package immediately upon discharge from said postheating means.

8. The process of claim 1 wherein said overlapped film edges are on the underside of the package.

References Cited

UNITED STATES PATENTS

| | | | |
|---|---|---|---|
| 2,409,298 | 10/1946 | Merrill | 34—225 X |
| 2,906,627 | 9/1959 | Payton et al. | |
| 3,123,955 | 3/1964 | Weissensee et al. | 53—33 X |
| 3,171,238 | 3/1965 | Dreyfus | 53—33 X |
| 3,221,473 | 12/1965 | Brown | 53—184 X |
| 3,222,800 | 12/1965 | Siegel et al. | 53—184 |
| 3,257,769 | 6/1966 | Ford | 53—30 X |
| 3,309,789 | 3/1967 | Denker | 53—184 X |
| 3,309,835 | 3/1967 | Peppler | 53—30 |

TRAVIS S. McGEHEE, *Primary Examiner.*

R. L. FARRIS, *Assistant Examiner.*

UNITED STATES PATENT OFFICE
CERTIFICATE OF CORRECTION

Patent No. 3,399,506                          September 3, 1968

Milton A. Howe, Jr.

It is certified that error appears in the above identified patent and that said Letters Patent are hereby corrected as shown below:

Column 6, line 3, "said", first occurrence, should read -- air --.

Signed and sealed this 27th day of January 1970.

(SEAL)
Attest:

Edward M. Fletcher, Jr.                      WILLIAM E. SCHUYLER, JR.
Attesting Officer                             Commissioner of Patents